(12) United States Patent
Fast

(10) Patent No.: US 10,774,920 B2
(45) Date of Patent: Sep. 15, 2020

(54) TRANSMISSION-MOUNTABLE COOLER KIT AND A METHOD OF MANUFACTURING AND MOUNTING THE SAME

(71) Applicant: Verlyn Ray Fast, Lafayette, IN (US)

(72) Inventor: Verlyn Ray Fast, Lafayette, IN (US)

( * ) Notice: Subject to any disclaimer, the term of this patent is extended or adjusted under 35 U.S.C. 154(b) by 164 days.

(21) Appl. No.: 16/030,982

(22) Filed: Jul. 10, 2018

(65) Prior Publication Data

US 2020/0018387 A1    Jan. 16, 2020

(51) Int. Cl.
*F16H 57/04* (2010.01)
*F28D 1/02* (2006.01)

(52) U.S. Cl.
CPC ....... *F16H 57/0416* (2013.01); *F28D 1/0233* (2013.01); *F28D 2001/0286* (2013.01)

(58) Field of Classification Search
CPC .. F16H 57/0416; F16H 57/0415; F16H 57/03; F16H 57/031; F16H 2057/02013; F16H 2057/02026; F28D 1/0233; F28D 2001/0286
See application file for complete search history.

(56) References Cited

U.S. PATENT DOCUMENTS

| | | | | |
|---|---|---|---|---|
| 4,641,547 A | * | 2/1987 | Stich | F16H 57/025 74/606 R |
| 4,856,581 A | * | 8/1989 | Santoro | F16L 37/107 165/130 |
| 6,202,736 B1 | * | 3/2001 | Fast | F16H 57/0415 165/185 |
| 2003/0234133 A1 | * | 12/2003 | Sugimoto | B60K 17/04 180/377 |
| 2018/0087647 A1 | * | 3/2018 | Poster | F16H 57/0416 |

* cited by examiner

*Primary Examiner* — Daniel D Yabut
(74) *Attorney, Agent, or Firm* — Dunlap Bennett & Ludwig, PLLC

(57) ABSTRACT

A transmission-mountable transmission cooler and method of installing and manufacturing the same is provided. The transmission cooler is adapted to couple directly to the transmission via a power take-off aperture typically found on manual truck transmissions. As a result, the transmission cooler may be made from an extruded aluminum piece to which tool and die making has provides a bolt pattern that matches the bolt pattern of a standard power take-off cover of the power take-off aperture, resulting in a cost-effective method of installation and in turn manufacture.

1 Claim, 2 Drawing Sheets

TRANSMISSION-MOUNTABLE COOLER KIT AND A METHOD OF MANUFACTURING AND MOUNTING THE SAME

BACKGROUND OF THE INVENTION

The present invention relates to truck transmission cooling system and, more particularly, to a transmission-mountable transmission cooler kit, the transmission cooler being adapted to mount directly to the transmission via a power take-off aperture provided by the transmission. The present invention also embodies a method of manufacturing and installing the transmission-mountable cooler kit.

The more work done by a truck transmission, the hotter it gets, and heat is an enemy of the transmission. An aftermarket transmission cooler can keep the transmission from getting too hot, facilitating optimal performance and a longer life out of the transmission.

Traditionally, fluid heated by the transmission flows to the cooler, and air moving over the fins of the cooler cools the fluid, which is then routed back to the transmission in a continuous loop through the return line. Installing a transmission cooler, however, may require special fittings just for the connection of the rubber hoses going to and coming from the transmission cooler in-line with the transmission's return line and the transmission cooler.

As can be seen, there is a need for a transmission-mountable cooler kit, wherein the transmission-mountable cooler is adapted to mount directly to the transmission via a power take-off aperture provided by the transmission, so that a cost-effective method of manufacturing and installing may be taken advantage of. Power Take-Offs (PTOs) are mechanical gearboxes that attach to PTO apertures provided on truck transmissions and are used to transfer the power of the vehicle engine to auxiliary components, most commonly a hydraulic pump. By providing a method of mounting the transmission-mountable cooler via the PTO aperture, the present invention enables a method of manufacturing and installing transmission-mountable transmission coolers that simplify and thereby lowers the cost of coupling a cooler to a truck transmission. Mainly, by obviating the need for a loop line and its associated special fasteners and replace them with a solution involving less parts wherein the replacement parts utilize Society of Automotive Engineers (SAE) standardized fastener elements. In other words, the transmission-mountable cooler kit of the present invention amounts to producing an extension for 6 bolt SAE PTO covers found on manual truck transmissions. Furthermore, the method of installing and manufacturing involve similarly processes involved in manufacturing and installing PTO covers—through affordable, well-established practices of extrusion and tool and die making. In contrast, die casting and CNC machining and other methods are not as cost effective as the method disclosed above of manufacturing and mounting the embodied heat-dissipating transmission cooler as, in effect, a PTO cover extension. The transmission cooler may fit manual truck transmissions through matching the bolt pattern of the SAE PTO covers typically found on manual truck transmissions.

SUMMARY OF THE INVENTION

In one aspect of the present invention, a transmission cooling system including a transmission providing a power take-off aperture; a periphery of the power take-off aperture providing a plurality of mounting holes having a first pattern; an extruded cooler body extending between a first end and a second end; and each end providing a plurality of cooler holes matching, at least in part, the first pattern.

In another aspect of the present invention, a method of manufacturing the above-mentioned transmission coolers including the steps of shaping said extruded cooler body required to match the first pattern; providing said plurality of cooler holes into said extruded cooler body; extruding a length of said extruded cooler body, a distance of the length equal to or greater than an end distance between said first and second ends; and cutting said length at the end distance from a distal end thereof.

In yet another aspect of the present invention, method of installing the extruded cooler body of claim 1 to a transmission having a power take-off aperture covered by a power take-off plate providing a plurality of plate mounting holes arranged in at least in part the first pattern, including the steps of removing the power take-off plate; abutting the first end along the periphery so that the plurality of cooler holes aligns in part with the first pattern; placing the power take-off plate along the second end so that the plurality of plate mounting holes aligns in part to the first pattern; and initially connecting the power take-off plate and the extruded cooler body to the transmission with one fastener through one of the plurality of plate mounting holes, one of the plurality of cooler holes, and one of the plurality of mounting holes.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a transmission-mountable transmission cooler adapted to mount directly to the transmission via a power take-off aperture provided by the transmission. As a result, the transmission cooler may be made from an extruded aluminum piece to which tool and die making has provides a bolt pattern that matches the bolt pattern of standard power take-off covers typically found on manual truck transmissions, resulting in a cost-effective method of installation and in turn manufacture.

Referring to FIGS. 1 through 4, the present invention may include a transmission-mountable cooler kit, the transmission-mountable cooler 10 being adapted to mount directly to the transmission 20 via a power take-off aperture 50 commonly provided by the transmission 20.

Figure 1:
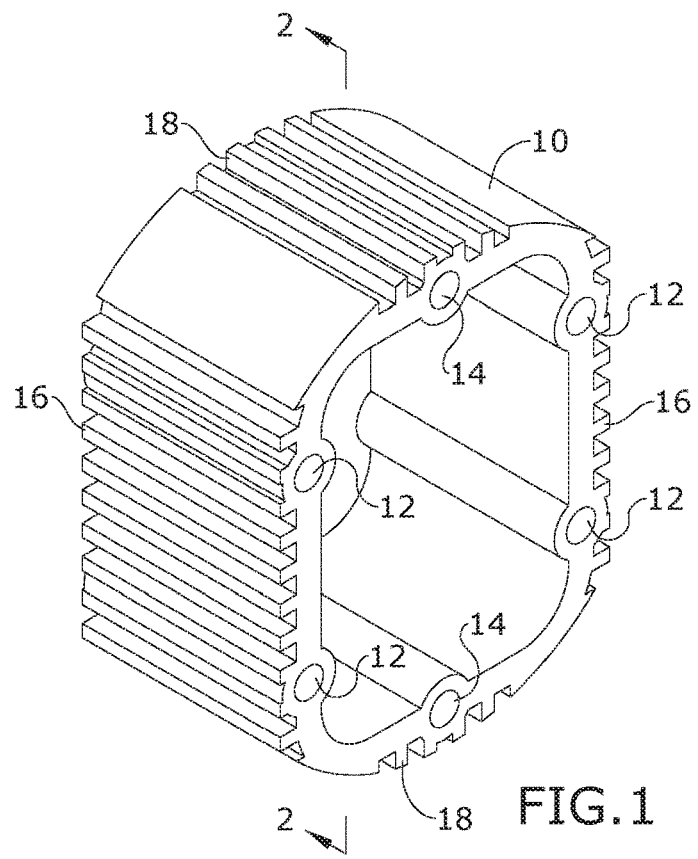
FIG. 1 is a perspective view of an exemplary embodiment of the present invention.
Figure 2:
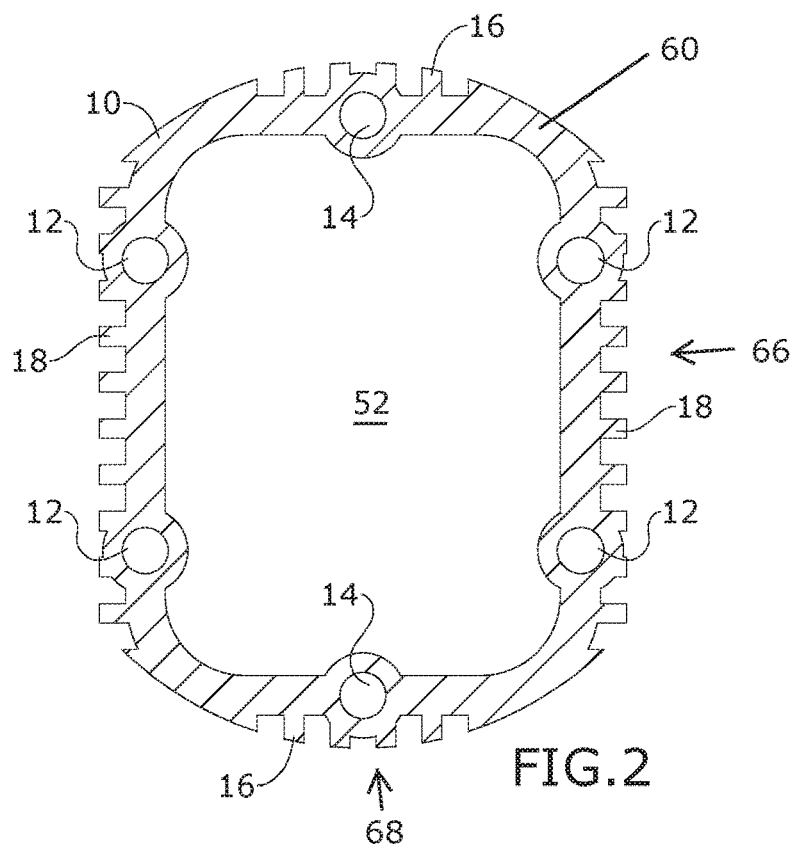
FIG. 2 is a section view of an exemplary embodiment of the present invention, taken along line 2-2 in FIG. 1.

The transmission-mountable cooler 10 may be made from an extruded aluminum (or equivalent material) piece that provides a bolt pattern that matches the bolt pattern of a SAE PTO covers for said PTO apertures 50. The transmission-mountable cooler 10 provides a generally tubular body 60 defining an enclosure 52 dimensioned and adapted to be generally coextensive with the PTO aperture 50 in question. The body 60 may be generally rectangular (though with rounded corners) having two longitudinal sides 66 interconnected by two latitudinal sides 68, as illustrated in FIG. 2. The latitudinal sides 68 provide latitudinal side cooling fins 18, while the longitudinal sides 66 provide longitudinal cooling fins 16.

Figure 3:
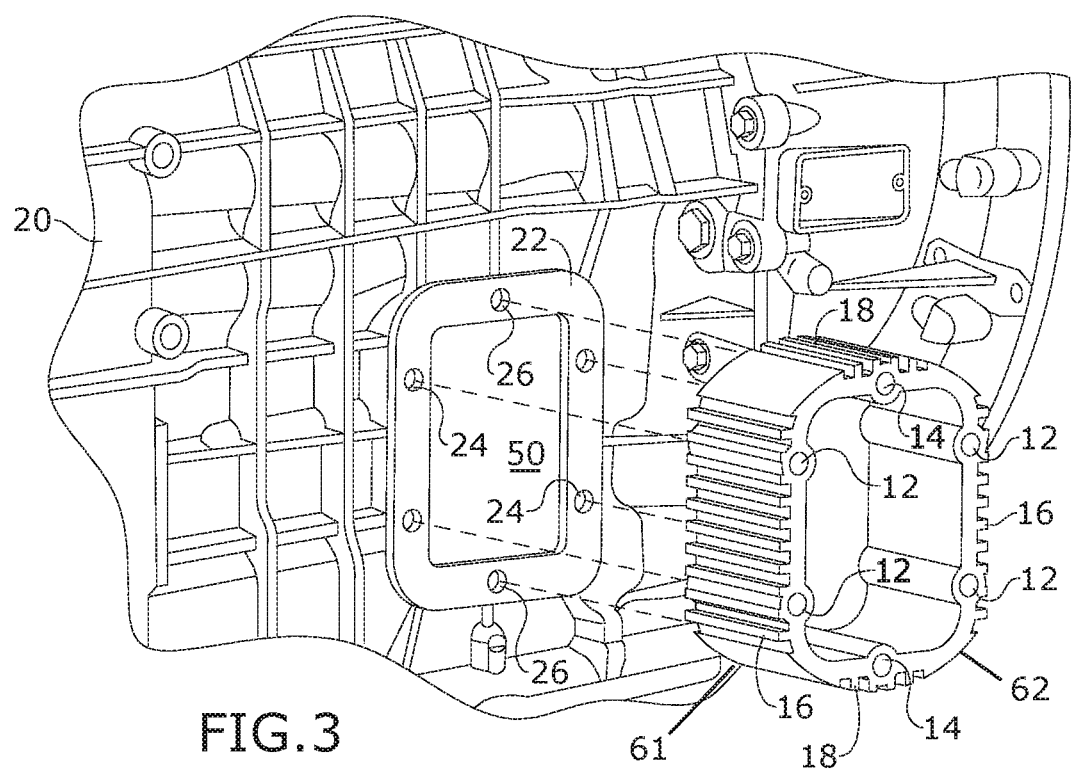
FIG. 3 is a perspective view of an exemplary embodiment of the present invention, illustrating installation.

The body 60 may extend from a first end 61 to a second end 62, which may be symmetrical and mirror images of each other. Each end 61 and 62 may provide a plurality of longitudinal mounting holes 12 and latitudinal mounting holes 14 provided to match the bolt pattern of SAE PTO cover (not shown) for the relevant PTO aperture 50. In certain embodiments the first end 61 may be interconnected along the PTO aperture 50 by a PTO mounting plate 22 having cooperating longitudinal plate mounting holes 24 and latitudinal mounting holes 26, as illustrated in FIG. 3. Note that the bolt pattern provided by the ends 61 and 62 may only match a portion of the pattern of mounting holes (24 and 26) provided by the transmission 20 and/or the PTO mounting plate 22, whereby a sufficient amount of cooler mounting holes 12 and 14 are provided to effectuate an operative engagement between the transmission 20 and the transmission cooler 10.

Figure 4:
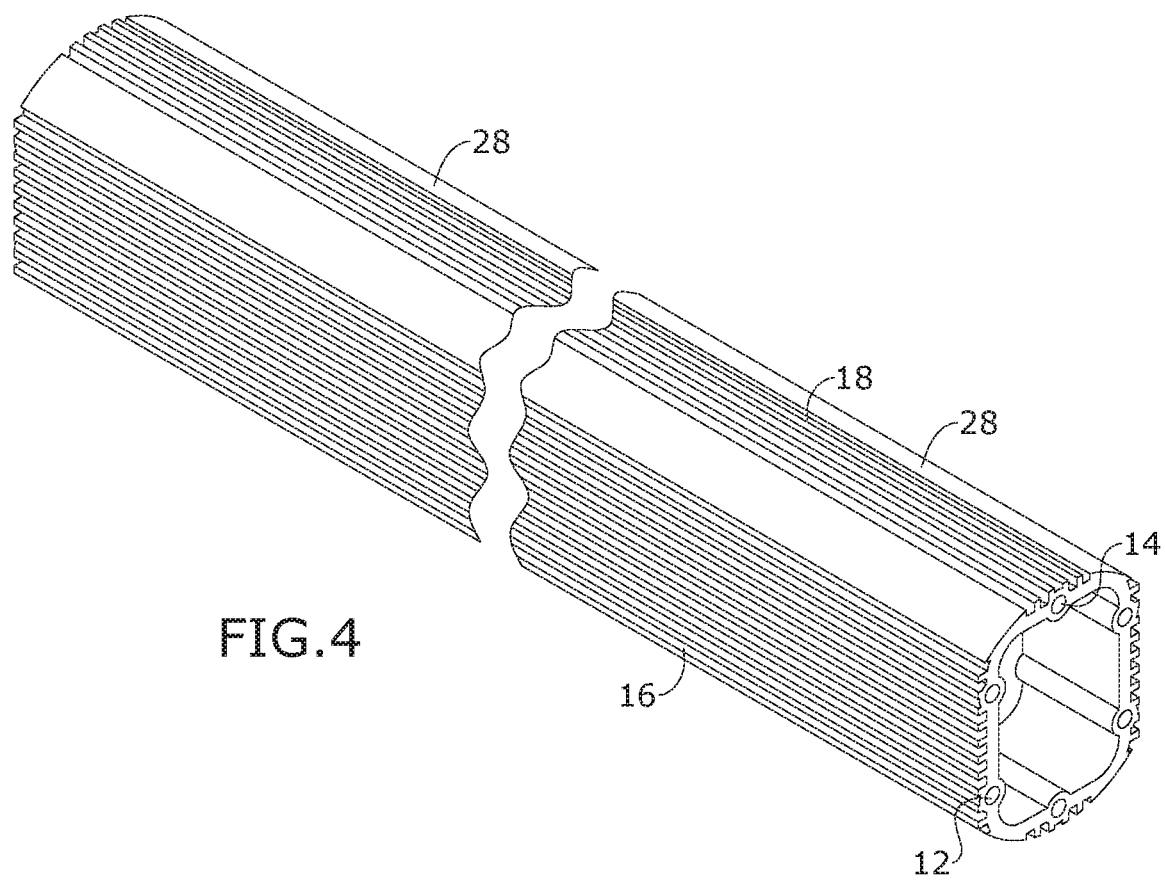
FIG. 4 is a perspective view of an exemplary embodiment of the present invention, illustrating an extended extruded cooling body as part of the inventive manufacturing process.

A method of making the present invention may include the following. A tool and die making process may be employed to manufacture the shape required to match the bolt pattern of the SAE PTO covers (to be replaced by the transmission-mountable cooler 10). An aluminum piece 28 is then extruded to lengths anywhere from 8 to 12 feet, as illustrated in FIG. 4. These lengths may then be cut to two to four-inch lengths; these shorter piece—transmission-mountable coolers 10—will then fit on manual transmissions found on many trucks as, in effect, a PTO cover extension.

A method of using the present invention may include the following. The transmission-mountable cooler 10 disclosed above may be provided. A user may mount the first end 61 of the transmission-mountable cooler 10 along a PTO aperture 50 by aligning the relevant mounting holes and using standard SAE fasteners to couple the transmission-mountable cooler 10 to the transmission 20. In certain embodiments, a cooperating aligned PTO mounting plate 22 may be disposed between the transmission-mountable cooler 10 and the transmission 20. Then the user may similarly cap the SAE PTO cover over the second end 62.

The process of producing an aluminum part by extruding the part and only cutting it one time to achieve the final product is the most cost-effective way to produce a 6 bolt SAE PTO cover extension.

It should be understood, of course, that the foregoing relates to exemplary embodiments of the invention and that modifications may be made without departing from the spirit and scope of the invention as set forth in the following claims.

What is claimed is:

1. A method of installing an extruded cooler body to a transmission having a power take-off aperture covered by a power take-off plate providing a plurality of plate mounting holes arranged in at least in part a first pattern, comprising:
   the extruded cooler body extending between the first end and a second end, wherein each end provides a plurality of cooler holes matching, at least in part, the first pattern, and wherein a periphery of the power take-off aperture provides a plurality of mounting holes having the first pattern;
   removing the power take-off plate;
   abutting the first end along the periphery so that the plurality of cooler holes aligns in part with the first pattern;
   placing the power take-off plate along the second end so that the plurality of plate mounting holes aligns in part to the first pattern; and
   initially connecting the power take-off plate and the extruded cooler body to the transmission with one fastener through one of the plurality of plate mounting holes, one of the plurality of cooler holes, and one of the plurality of mounting holes.

\* \* \* \* \*